US012660896B2

(12) United States Patent
Pao

(10) Patent No.: US 12,660,896 B2
(45) Date of Patent: Jun. 23, 2026

(54) PIVOT SHAFT ASSEMBLY FOR A FOLDABLE DEVICE

(71) Applicant: STEP2GOLD CO., LTD., Taichung City (TW)

(72) Inventor: Chih-Ting Pao, Taichung City (TW)

(73) Assignee: STEP2GOLD CO., LTD., Taichung City (TW)

( * ) Notice: Subject to any disclaimer, the term of this patent is extended or adjusted under 35 U.S.C. 154(b) by 112 days.

(21) Appl. No.: 18/924,371

(22) Filed: Oct. 23, 2024

(65) Prior Publication Data

US 2025/0143423 A1 May 8, 2025

(30) Foreign Application Priority Data

Nov. 2, 2023 (TW) ................................ 112142249

(51) Int. Cl.
*A45B 5/00* (2006.01)
*A61H 3/02* (2006.01)

(52) U.S. Cl.
CPC ............. *A45B 5/00* (2013.01); *A61H 3/0244* (2013.01); *A61H 2003/025* (2013.01); *A61H 2201/0107* (2013.01); *A61H 2201/1633* (2013.01); *A61H 2203/0431* (2013.01); *A61H 2205/086* (2013.01)

(58) Field of Classification Search
CPC .......... A45B 5/00; A61H 3/0244; A47C 4/286
See application file for complete search history.

(56) References Cited

U.S. PATENT DOCUMENTS 4,024,659 A * 5/1977 Ingerdahl .................. G09F 1/12 52/656.1
4,547,015 A * 10/1985 Wakimoto ............. A47C 4/286 297/16.2

(Continued)

FOREIGN PATENT DOCUMENTS

CN 106360901 A * 2/2017 ............... A45B 9/02
DE 202018004631 U1 * 10/2019 ............. A47C 9/105

(Continued)

OTHER PUBLICATIONS

English translation for EP-0252170-A1 (Year: 1988).*

(Continued)

*Primary Examiner* — David R Dunn
*Assistant Examiner* — Troy Alan Libby
(74) *Attorney, Agent, or Firm* — Burris Law, PLLC

(57) ABSTRACT

A pivot shaft assembly for a foldable device includes a base seat, a shaft member and a locking member. The base seat has a through hole and an engaging portion. The shaft member extends through the through hole, includes a fixed tubular piece with a radial hole, and is rotatable relative to the base seat. The locking member includes a locking portion movably disposed in the radial hole. The locking portion is movable through the radial hole to engage with the engaging portion to position the pivot shaft assembly in a locked state so as to prevent rotation of the shaft member relative to the base seat, and is movable inwardly of the fixed tubular piece to disengage from the engaging portion to make the pivot shaft assembly in a released state so as to permit rotation of the shaft member relative to the base seat.

11 Claims, 16 Drawing Sheets

(56) References Cited

U.S. PATENT DOCUMENTS

| | | | | | |
|---|---|---|---|---|---|
| 4,934,638 | A * | 6/1990 | Davis | A47C 9/105 | 108/118 |
| 5,975,626 | A * | 11/1999 | Aycock | A47C 9/105 | 297/16.2 |
| 6,170,907 | B1 * | 1/2001 | Tsai | A47C 1/12 | 297/16.1 |
| 6,270,156 | B1 * | 8/2001 | Metzger | A47C 4/286 | 297/16.2 |
| 7,229,128 | B2 * | 6/2007 | Lee | A47C 4/286 | 297/16.2 |
| 8,464,737 | B2 * | 6/2013 | La Chimia | A61H 3/0244 | 135/84 |
| 11,882,942 | B2 * | 1/2024 | Kang | A47C 4/286 | |
| 2004/0066064 | A1 * | 4/2004 | Neely | A47C 9/105 | 297/118 |
| 2022/0061535 | A1 * | 3/2022 | Pao | A47C 9/105 | |

FOREIGN PATENT DOCUMENTS

| | | | | |
|---|---|---|---|---|
| EP | 0252170 | A1 * | 1/1988 | A47C 9/105 |
| GB | 2471733 | A * | 1/2011 | A47K 11/02 |
| TW | M467398 | | 12/2013 | |
| WO | WO-0035317 | A1 * | 6/2000 | A47C 9/105 |

OTHER PUBLICATIONS

English translation for CN-106360901-A (Year: 2017).*
English translation for DE-202018004631-U1 (Year: 2019).*
Bass Pro Shops Travel Lite Tripod Stool, https://www.basspro.com/p/bass-pro-shops-travel-lite-tripod-stool (Year: 2023).*

* cited by examiner

PIVOT SHAFT ASSEMBLY FOR A FOLDABLE DEVICE

CROSS-REFERENCE TO RELATED APPLICATION

This application claims priority to Taiwanese Patent Application No. 112142249, filed on Nov. 2, 2023, and incorporated by reference herein in its entirety.

FIELD

The disclosure relates to a foldable device with a rotatable shaft assembly, and more particularly to a pivot shaft assembly with folding locking means.

BACKGROUND

A conventional folding crutch chair disclosed in TWM467398U includes a positioning seat, three rotatable legs rotatably extending through the positioning seat, a cloth attached to upper ends of the legs, and two tie wraps disposed on upper and lower ends of one leg. The cloth is spread out by the legs when the legs are unfolded for providing a seating surface. When the folding crutch chair is folded, the legs are close together and parallel to one another and the tie wraps surround the upper and lower ends of the legs to secure them together. However, to unfold the folding crutch chair, it is required to detach the tie wraps at the upper and lower ends of the legs. Also, to fold the folding crutch chair, the user must hold the parallel legs while tightening the tie wraps, which renders the operation inconvenient and laborious.

SUMMARY

Therefore, an object of the disclosure is to provide a pivot shaft assembly for a foldable device that can alleviate at least one of the drawbacks of the prior art.

According to the disclosure, the pivot shaft assembly for a foldable device includes a pivot base, a shaft member and a locking member. The pivot base includes a base seat, a through hole which extends through the base seat in a first direction, and an engaging portion which is disposed on the base seat adjacent to the through hole. The shaft member extends along a central axis through the through hole. The shaft member includes a fixed tubular piece which extends through the through hole and which has a fixed tubular wall surrounding the central axis. The fixed tubular piece is pivotably connected with the base seat about a rotating axis which is transverse to the central axis and the first direction. The fixed tubular piece has a radial hole which extends radially relative to the central axis through the fixed tubular wall. The shaft member is rotatable relative to the base seat between a ready position, where the shaft member extends parallel to the first direction, and the radial hole faces the engaging portion, and a swung position, where the shaft member is inclined relative to the first direction by an inclined angle, and the radial hole is remote from the engaging portion. The locking member includes a locking portion which is movably disposed in the radial hole such that the locking portion is movable radially and outwardly of the fixed tubular wall through the radial hole to engage with the engaging portion when the shaft member is in the ready position to position the pivot shaft assembly in a locked state so as to prevent rotation of the shaft member relative to the base seat, and is movable radially and inwardly of the fixed tubular wall through the radial hole to disengage from the engaging portion to make the pivot shaft assembly in a released state so as to permit rotation of the shaft member relative to the base seat.

With the locking member disposed on the shaft member and the engaging portion disposed on the base seat, when the shaft member is in the ready position and when the locking portion is moved toward the engaging portion to be engaged with the engaging portion, the shaft member is retained to the base seat to prevent rotation thereof relative to the base seat. When the locking portion is moved toward the radial hole to disengage from the engaging portion, the shaft member is permitted to be rotated relative to the base seat.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
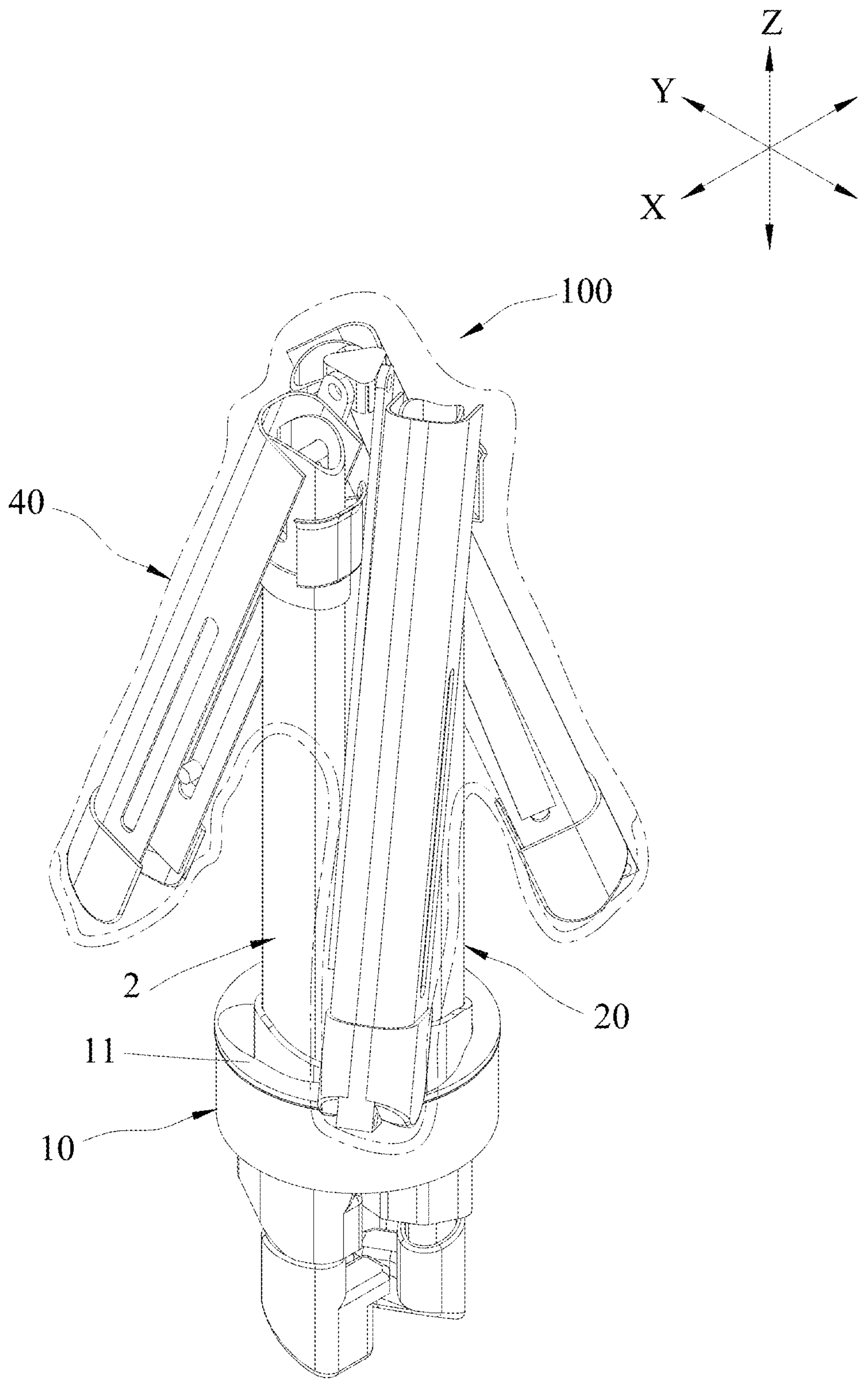
FIG. 1 is a perspective view illustrating a foldable device in a folded state, the foldable device including an embodiment of a pivot shaft assembly according to the disclosure, wherein the embodiment is in a locked state and a shaft member of the embodiment is in a ready position relative to a base seat.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly. In the following description, a first direction (Z), a second direction (X) and a third direction (Y) are transverse to one another. The first direction (Z) is substantially an up-down direction.

Figure 2:
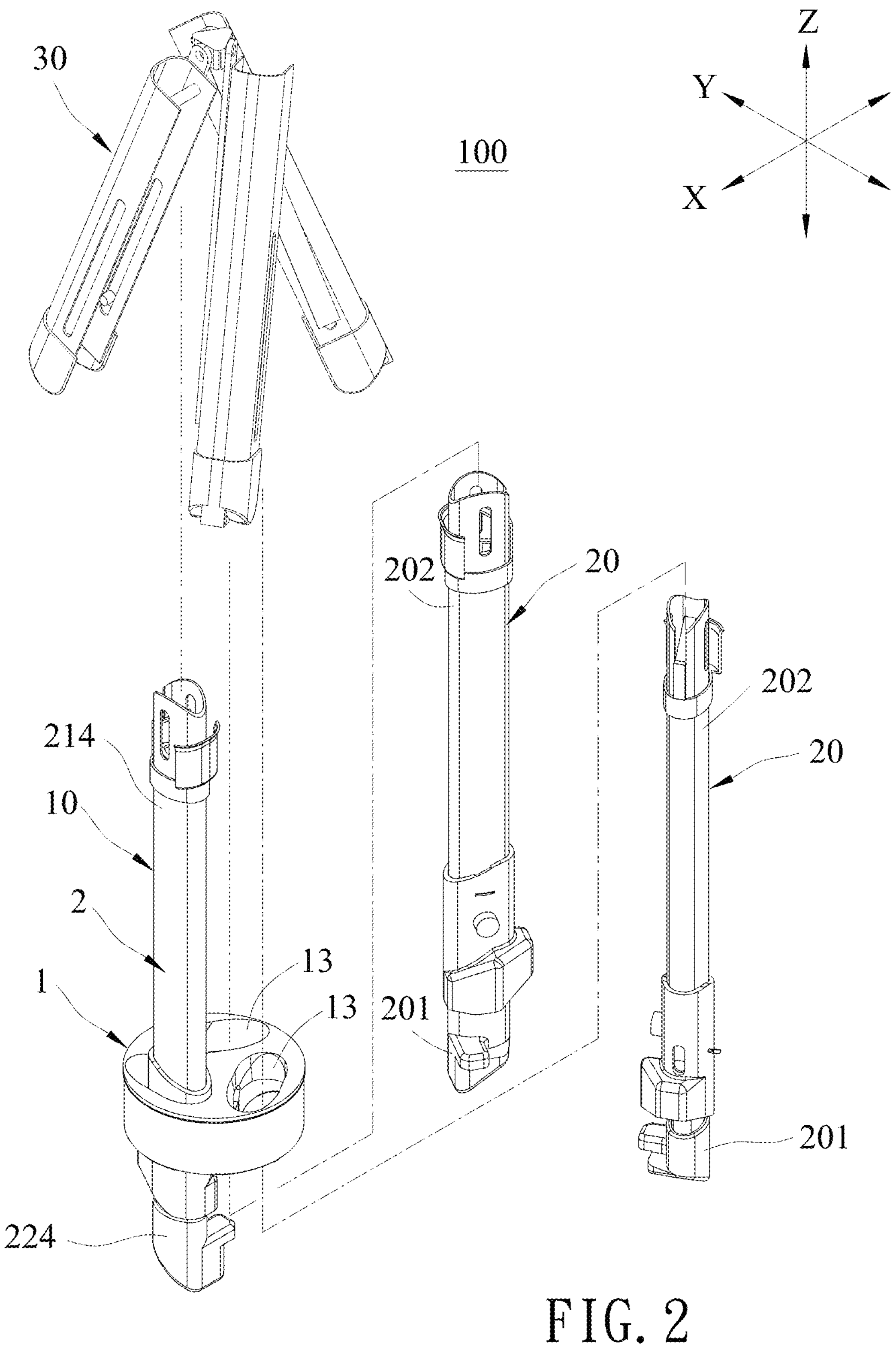
FIG. 2 is an exploded perspective view of the foldable device.

Referring to FIGS. 1 and 2, an embodiment of a pivot shaft assembly 10 according to the disclosure is adapted for a foldable device 100. The foldable device 100 includes the pivot shaft assembly 10, two support shafts 20, a linking unit 30 and a seating unit 40.

Figure 3:
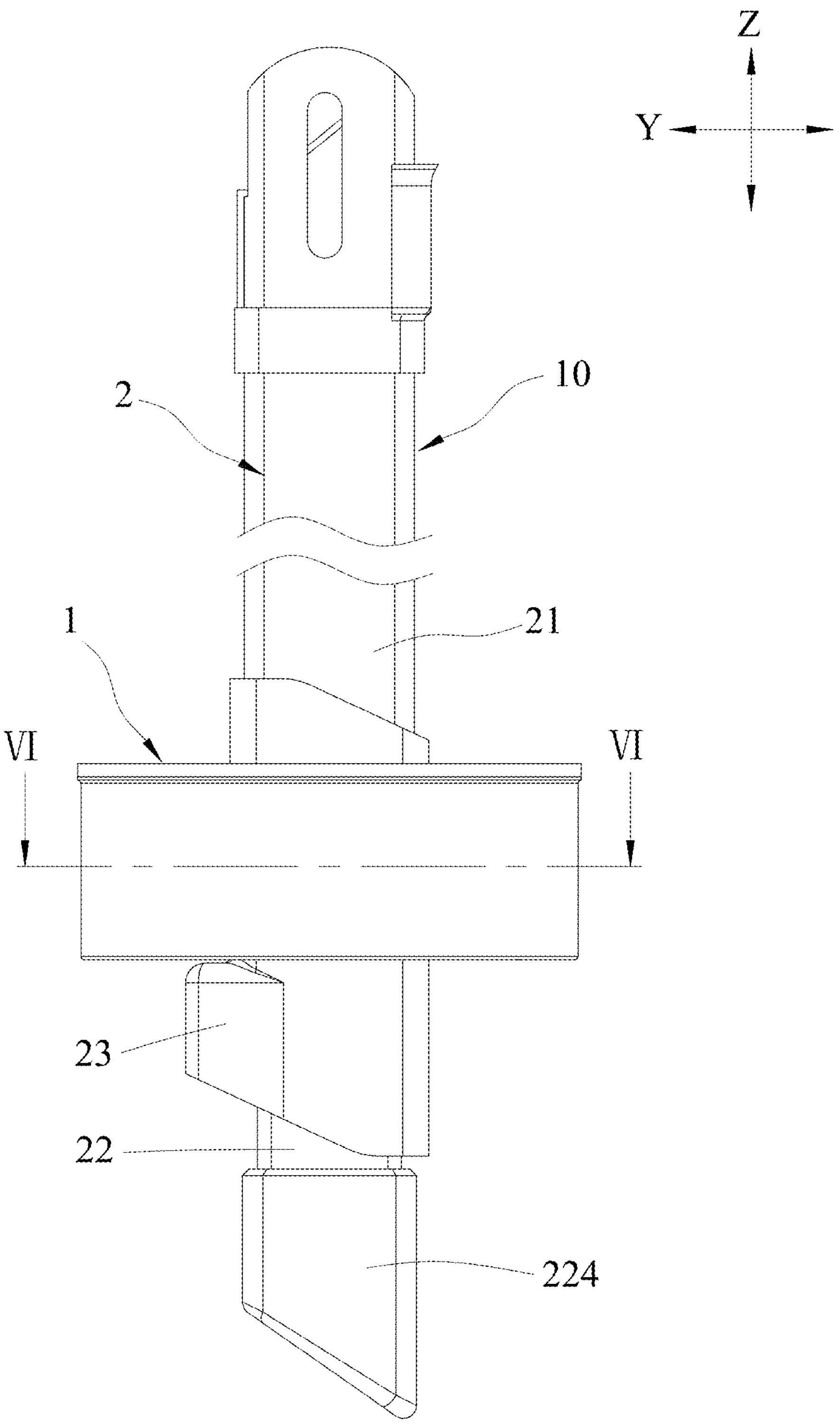
FIG. 3 is a fragmentary side view of the embodiment.
Figure 4:
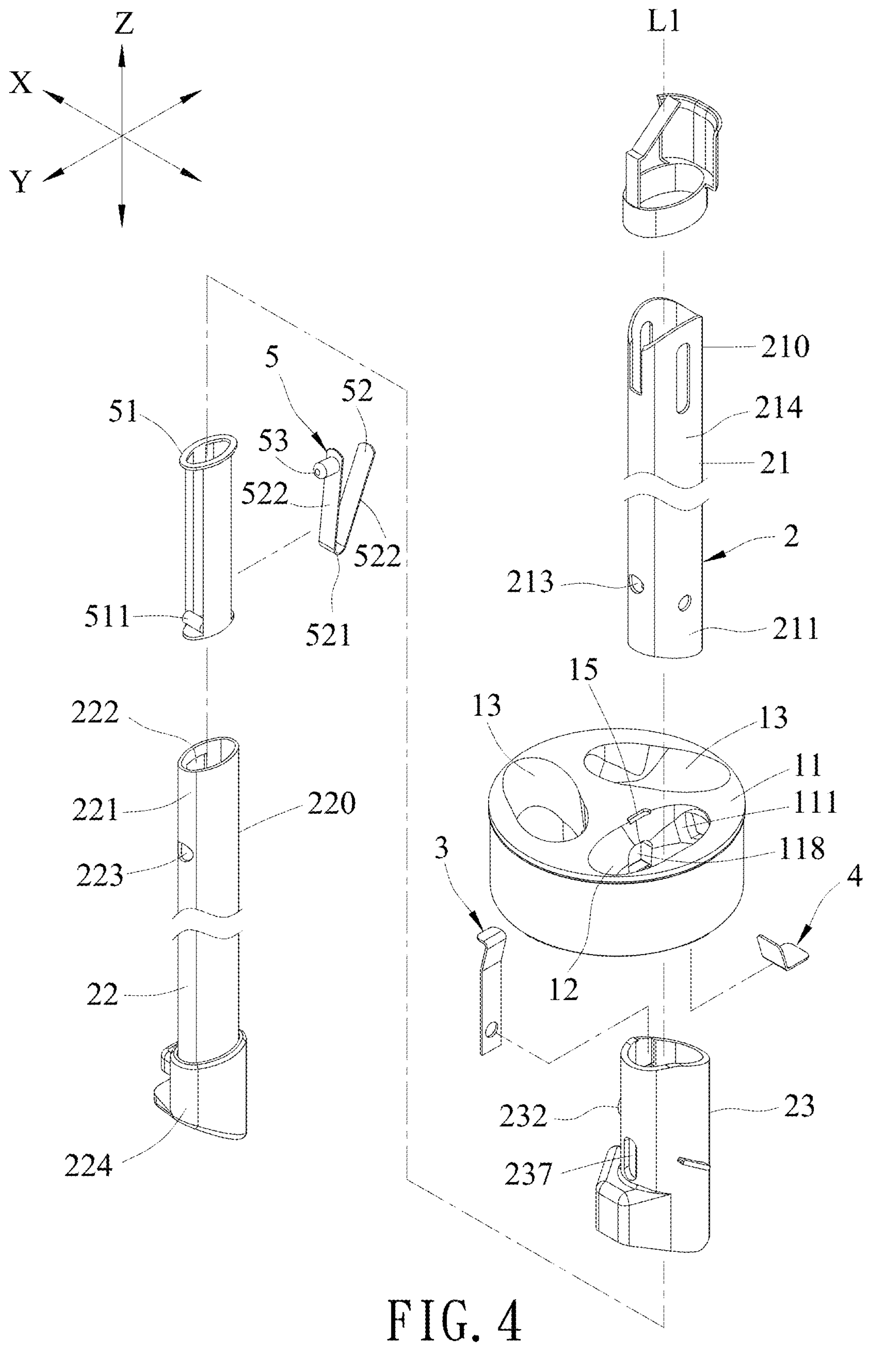
FIG. 4 is a fragmentary, exploded perspective view of the embodiment.

With reference to FIGS. 3 and 4, the pivot shaft assembly 10 of the embodiment includes a pivot base 1, a shaft member 2, a locking member 3, a biasing member 4 and a fastening unit 5.

Figure 5:
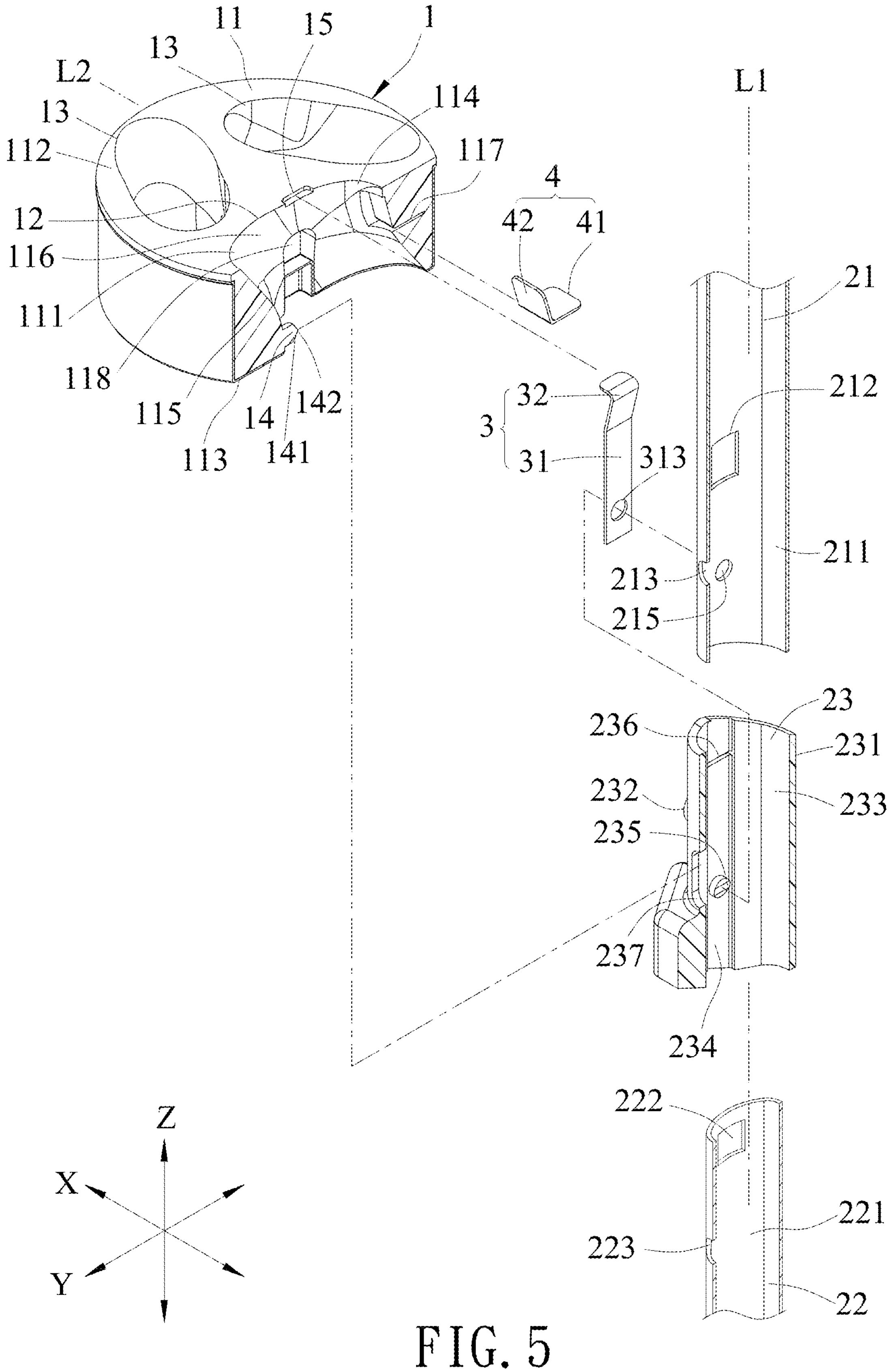
FIG. 5 is a fragmentary, exploded perspective view of the embodiment.

With reference to FIG. 5, the pivot base 1 includes a base seat 11, a through hole 12 which extends through the base seat 11 in the first direction (Z), two support holes 13 which extend through the base seat 11 in the first direction (Z), a guiding portion 14 which is disposed on the base seat 11 adjacent to the through hole 12, and an engaging portion 15 which is disposed on the base seat 11 adjacent to the through hole 12.

The base seat 11 has an inner seat wall 111 which defines the through hole 12, a first end wall 112 and a second end wall 113 which are respectively connected with two sides of the inner seat wall 111 along the first direction (Z) and opposite to each other. The first end wall 112 is located above the second end wall 113.

The inner seat wall 111 of the base seat 11 has a first inner wall section 114 and a second inner wall section 115 which are opposite to each other along the third direction (Y) and at two sides of the through hole 12, respectively, and a connecting wall section 116 which interconnects the first inner wall section 114 and the second inner wall section 115. Each of the first inner wall section 114 and the second inner wall section 115 extends and is inclined relative to the first direction (Z). The first inner wall section 114 has a retaining groove 117 formed therein. The base seat 11 further has a pivot hole 118 which is formed in the connecting wall section 116. The guiding portion 14 projects from the second inner wall section 115 adjacent to the second end wall 113, and has a taper guiding slope 141 extending and tapered toward the through hole 12 to terminate at a tip end 142. The engaging portion 15 is a slot which is recessed from the inner seat wall 111 at the juncture between the connecting wall section 116 and the first end wall 112.

Figure 6:
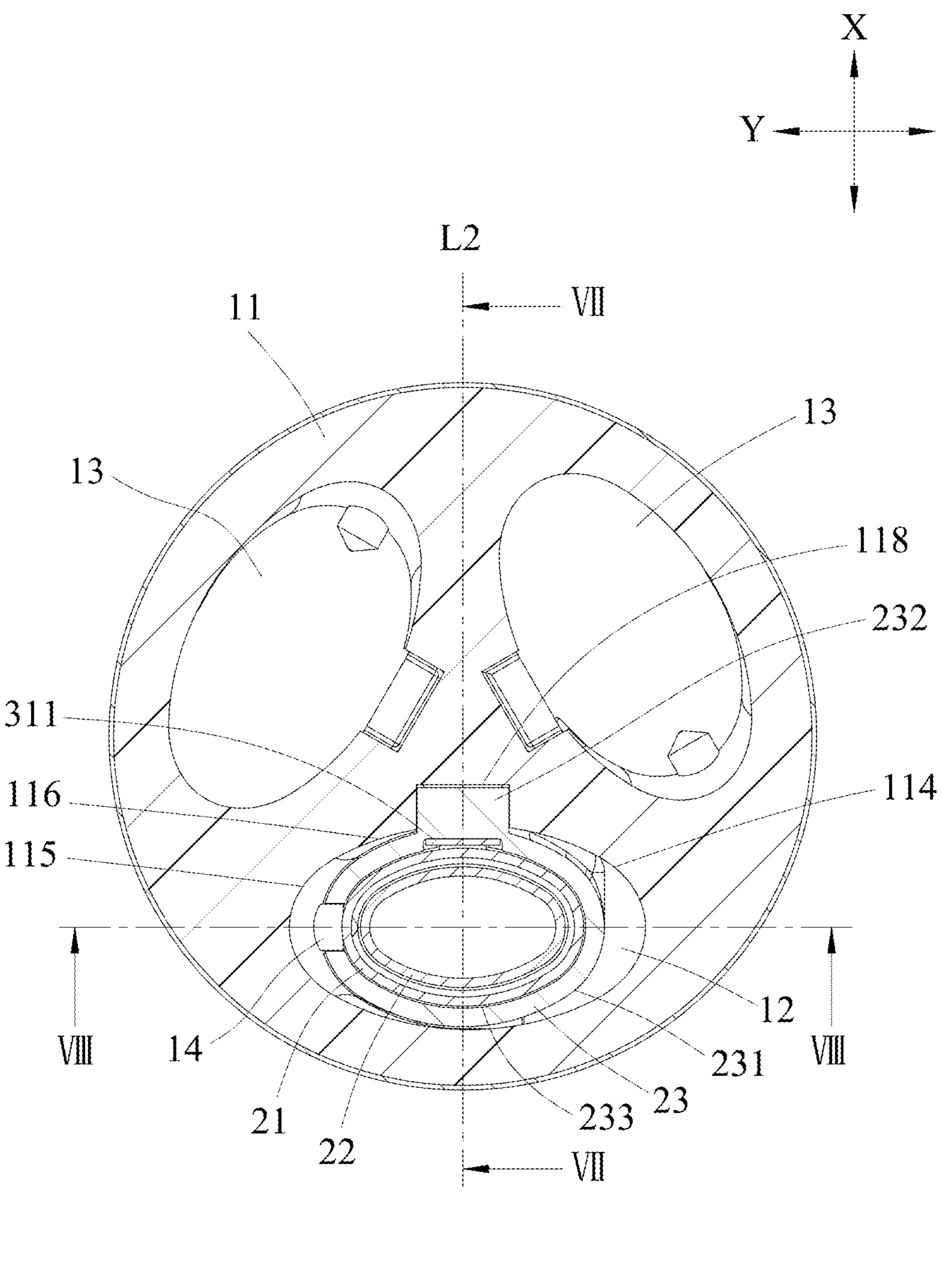
FIG. 6 is a sectional view taken along line VI-VI of FIG. 3.

With reference to FIGS. 5 and 6, the support holes 13 are angularly spaced apart from the through hole 12. In this embodiment, each support hole 13 is configured similar to the through hole 12 but the retaining groove 117 and the engaging portion 15 formed in the inner seat wall 111 which defines the through hole 12 are dispensed with.

With reference to FIGS. 4 to 6, the shaft member 2 extends along a central axis (L1) through the through hole 12, and is rotatable relative to the base seat 11 about a rotating axis (L2) that extends through the pivot hole 118 of the base seat 11. In other words, the rotating axis (L2) extends along the second direction (X) and is transverse to the central line (L1) and the first direction (Z).

The shaft member 2 is a telescopic tube assembly, and includes a fixed tubular piece 21 which extends through the through hole 12 and which has a fixed tubular wall 210 surrounding the central axis (L1), a movable tubular piece 22 which is movably disposed within the fixed tubular piece 21 and which has a movable tubular wall 220 surrounding the central axis (L1), and a pivot seat 23 which is securely connected with and surrounds the fixed tubular wall 210 and which is pivotably connected with the base seat 11. The fixed tubular wall 210 has an accommodating end portion 211, a radial hole 212 which extends radially relative to the central axis (L1) through the accommodating end portion 211, a fastener extending hole 213 which extends radially relative to the central axis (L1) and transverse to the rotating axis (L2) through the accommodating end portion 211, a mounting end portion 214 which is formed opposite to and above the accommodating end portion 211, and a securing hole 215 which extends radially relative to the central axis (L1) through the accommodating end portion 211 and below the radial hole 212.

The movable tubular wall 220 of the movable tubular piece 22 has an insert end portion 221 which is inserted into the accommodating end portion 211, a retreat hole 222 which extends radially relative to the central axis (L1) and parallel to the rotating axis (L2) through the insert end portion 221, a fastening hole 223 which extends radially relative to the central axis (L1) and transverse to the rotating axis (L2) through the insert end portion 221, and a support end portion 224 which is formed opposite to and below the insert end portion 221. The movable tubular piece 22 is moved relative to the fixed tubular piece 21 to position the support end portion 224 remote from the fixed tubular piece 21 so as to elongate the shaft member 2, and to bring the support end portion 224 close to the fixed tubular piece 21 so as to shorten the shaft member 2.

The pivot seat 23 has an outer surrounding surface 231 which faces the inner seat wall 111 of the base seat 11, a pivot pin 232 which projects from the outer surrounding surface 231 and which is rotatably disposed in the pivot hole 118 of the base seat 11 to define the rotating axis (L2), an inner surrounding surface 233 which is radially opposite to the outer surrounding surface 231 and which surrounds the fixed tubular wall 210 of the fixed tubular piece 21, a retaining groove 234 which is formed in the inner surrounding surface 233 and which extends along a direction parallel to the central axis (L1), a retaining protrusion 235 which projects from the inner surrounding surface 233 and which is formed in the retaining groove 234, a slot 236 which extends radially from the outer surrounding surface 231 to the inner surrounding surface 233, and an elongated hole 237 which extends radially from the outer surrounding surface 231 to the inner surrounding surface 233 and which is elongated in the direction parallel to the central axis (L1).

Figure 7:
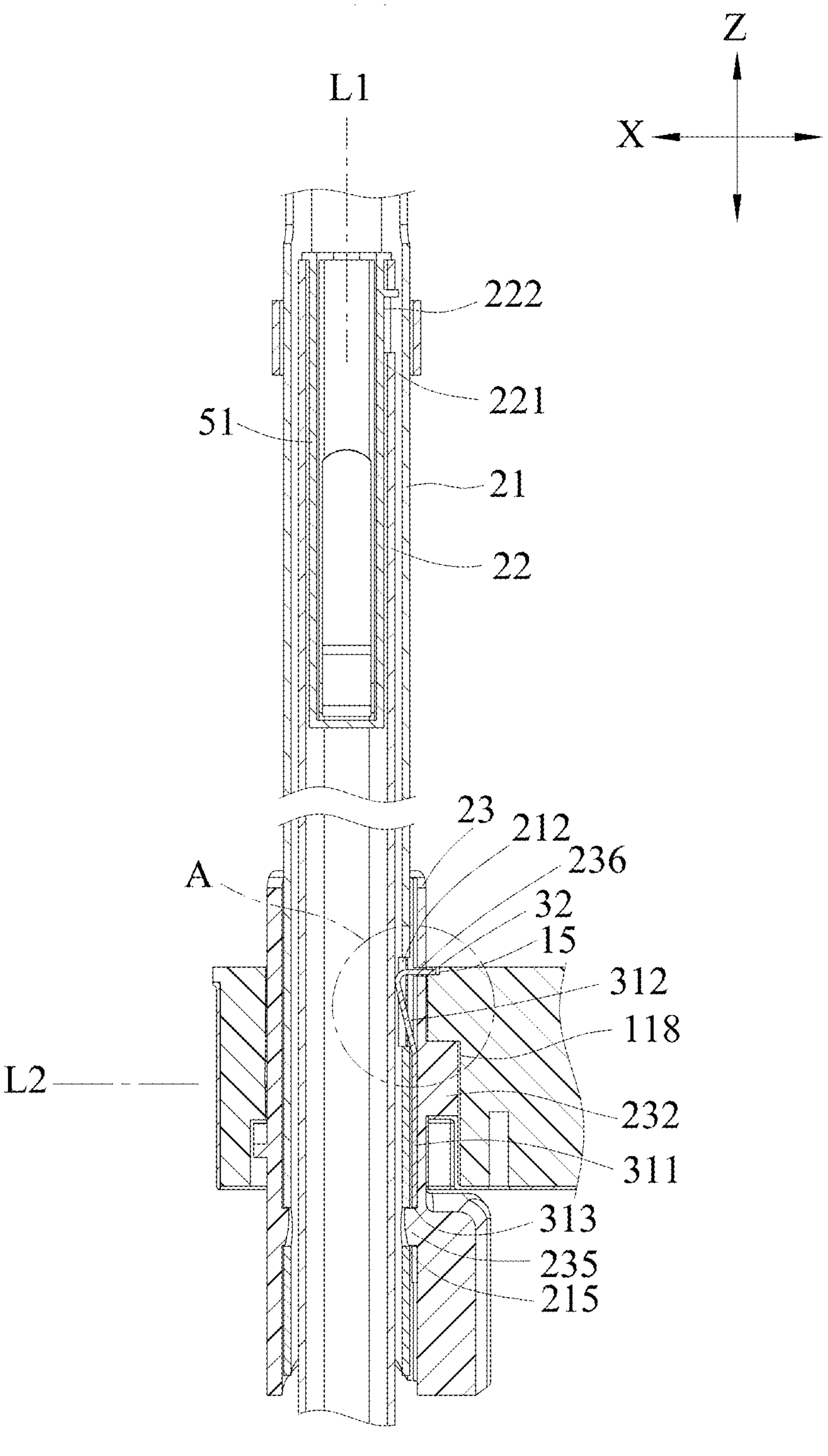
FIG. 7 is a fragmentary sectional view taken along line VII-VII of FIG. 6.
Figure 8:
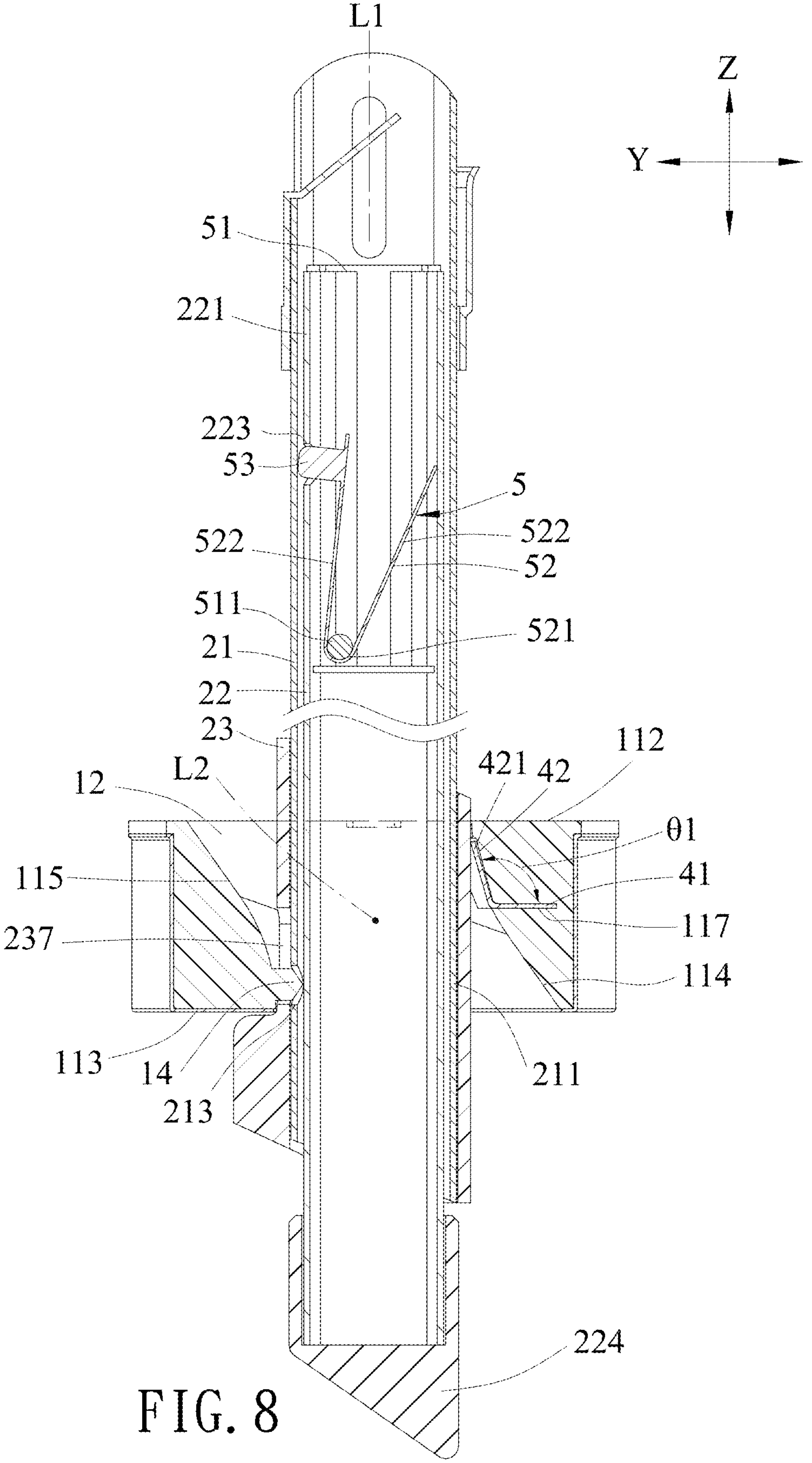
FIG. 8 is a sectional view taken along line VIII-VIII of FIG. 6.

With reference to FIGS. 5, 7 and 8, the retaining protrusion 235 of the pivot seat 23 is inserted into the securing hole 215 of the fixed tubular piece 21. The slot 236 is located upwardly of the retaining protrusion 235 and extends in a direction transverse to the direction of the central axis (L1). The slot 236 is aligned with the radial hole 212 of the fixed tubular piece 21. The elongated hole 237 is aligned with the fastener extending hole 213 of the fixed tubular piece 21.

In this embodiment, the fixed tubular piece 21 is securely connected with the pivot seat 23 to be pivotably connected with the base seat 11 through the pivot seat 23. Hence, the pivot seat 23, the fixed tubular piece 21 and the movable tubular piece 22 are rotatable relative to the base seat 11 about the rotating axis (L2). It is noted that a distance between the fastener extending hole 213 and the rotating axis (L2) is substantially the same as a distance between the guiding portion 14 and the rotating axis (L2). Thus, the shaft member 2 may be rotated relative to the base seat 11 to have the fastener extending hole 213 be brought close to the guiding portion 14, and then the guiding portion 14 may be insert into the elongated hole 237 and the fastener extending hole 213.

Figure 9:
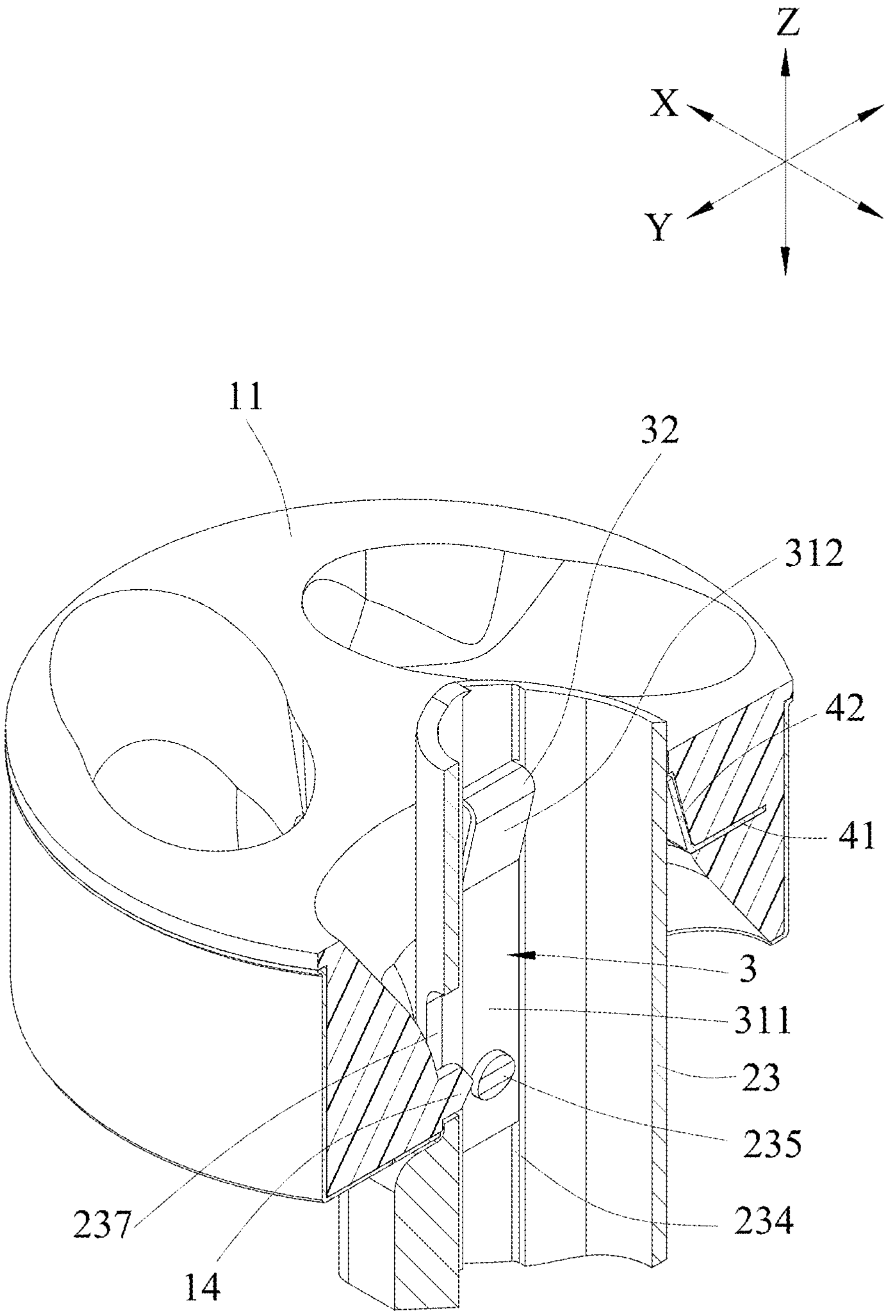
FIG. 9 is a fragmentary perspective view of a locking member, a pivot seat and a base seat of the embodiment.

With reference to FIGS. 5, 7 and 9, the locking member 3 is in the form of an integrally formed leaf spring which is bent with two bending joints, and includes a deformable portion 31 which is securely disposed on the fixed tubular wall 210 of the fixed tubular piece 21, and a locking portion 32 which is connected with the deformable portion 31.

The deformable portion 31 has a secured section 311 securely disposed on the fixed tubular wall 210 between the pivot seat 23 and the fixed tubular piece 21 and adjacent to the radial hole 212, and a spring section 312 extending from the secured section 311 toward the movable tubular wall 220 of the movable tubular piece 22 at an inclined angle relative to the secured section 311. The secured section 311 extends along the direction parallel to the central axis (L1) and is retainingly engaged in the retaining groove 234. The secured section 311 has a sleeve hole 313 to be sleeved on the retaining protrusion 235 of the pivot seat 23. The spring section 312 is bent away from the secured section 311 at an included angle which is greater than 90 degrees and smaller than 180 degrees.

Figure 10:
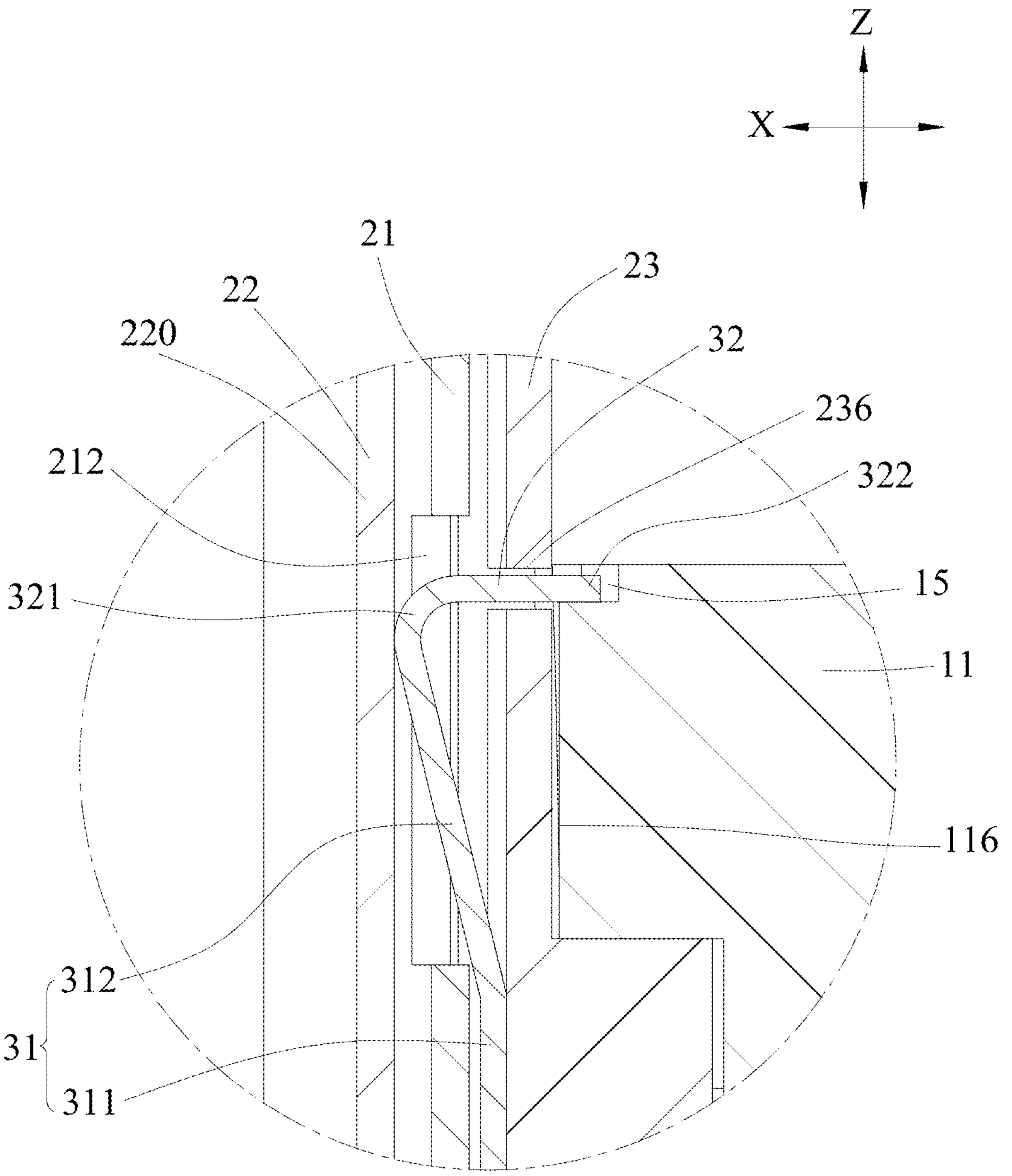
FIG. 10 is an enlarged view of an encircled portion (A) in FIG. 7.

With reference to FIG. 10, the locking portion 32 is movably disposed in the radial hole 212 and movable radially and outwardly of the fixed tubular wall 210 through the radial hole 212 to be inserted into the slot 236. The locking portion 32 has an abutted end 321 which is connected with an end of the spring section 312 opposite to the secured section 311, and an engaging end 322 which is opposite to the abutted end 321 and outwardly of the slot 236. Specifically, the abutted end 321 extends from and is bent relative to the spring section 312 at a bending angle which is smaller than 90 degrees. The engaging end 322 has a thickness which is slightly smaller than a width of the slot 236 along the direction parallel to the central axis (L1). Thus, the abutted end 321 of the locking portion 32 is biased and abutted against the movable tubular wall 220 of the movable tubular piece 22 with the biasing action of the deformable portion 31. That is, the deformable portion 31 generates a biasing force which urges the locking portion 32 toward the movable tubular piece 22.

With reference to FIGS. 5, 8 and 9, the biasing member 4 is disposed on the first inner wall section 114 of the base seat 11 and faces the pivot seat 23. The biasing member 4 is in the form of a V-shaped leaf spring, and has a retained portion 41 inserted into the retaining groove 117 of the base seat 11, and a biasing portion 42 extending from the retained portion 41 toward the first end wall 112. The biasing portion 42 has a biasing end 421 opposite to the biasing portion 41 to be biased and abut against the pivot seat 23. Thus, the biasing member 4 has a torque applying to the pivot seat 23 at a position between the rotating axis (L2) and the first end wall 112 in the first direction (Z). Thus, the biasing end 421 abuts against the pivot seat 23 to permit the shaft member 2 to be rotatable relative to the base seat 11 about the rotating axis (L2).

With reference to FIGS. 4 and 8, the fastening unit 5 includes a tubular seat 51 securely disposed in the insert end portion 221 of the movable tubular piece 22, a V-shaped leaf spring 52 disposed in the tubular seat 51, and a fastening protrusion 53 projecting from the leaf spring 52 to engage in the fastening hole 223.

The tubular seat 51 has a pivot pin 511 extending in a direction parallel to the rotating axis (L2) and disposed at a side transverse to the directions of the central axis (L1) and the rotating axis (L2) and adjacent to the fastening hole 223. The leaf spring 52 has a bending portion 521 surrounding the pivot pin 511, and two leaf spring portions 522 extending from two ends of the bending portion 521. One leaf spring portion 522 abuts against the movable tubular wall 220, and the other leaf spring portion 522 is disposed with the fastening protrusion 53. The bending portion 521 is closer to the support end portion 224 in relation to the fastening protrusion 53. Thus, the leaf spring 52 urges the fastening protrusion 53 to extend through the fastening hole 223.

With reference to FIG. 2, the support shafts 20 respectively extend through the support holes 13 and are rotatable relative to the base seat 11. Each support shaft 20 includes a support end portion 201 and a mounting end portion 202 opposite to and upwardly of the support end portion 201. In this embodiment, each support shaft 20 is different from the shaft member 2 in that the support shaft 20 is free from the locking member 3. It is noted that, in other various embodiments, each support shaft 20 may be in the form of telescopic tubular pieces with other configurations.

With reference to FIGS. 1 and 2, the linking unit 30 is spreadably coupled with the mounting end portions 214, 202 of the fixed tubular piece 21 and the support shafts 20. The seating unit 40 is stretchably coupled with the linking unit 30 and is disposed upwardly of the linking unit 30. In this embodiment, the foldable device 100 is a folding crutch chair, and the seating unit 40 is a stretchable cloth for a user to be seated thereon. In other various embodiments, the foldable device 100 may be other mechanical apparatus or domestic equipment that may be used with the pivot shaft assembly 10, such as machine tools, foldable tables, toys, etc. It is noted that, since the structure of the support shafts 20, the linking unit 30 and the seating unit 40 may be of various known types, a detailed description thereof is omitted.

During the shifting operation of the foldable device 100, the operational relationship among the component parts of the pivot shaft assembly 10 is complicated, and in the following, the positional and connectional relationship among the component parts of the pivot shaft assembly 10 when the shaft member 2 is rotated relative to the base seat 11 about the rotating axis (L2) to a ready position is first described.

With reference to FIGS. 8 and 10, when the shaft member 2 is rotated relative to the base seat 11 to the ready position, the shaft member 2 extends parallel to the first direction (Z), a first side of the shaft member 2 facing the first inner wall section 114 abuts against a first portion of the first inner wall section 114 proximate to the first end wall 112, and is spaced apart from a second portion of the first inner wall section 114 proximate to the second end wall 113. Also, a second side of the shaft member 2 facing the second inner wall section 115 abuts against a second portion of the second inner wall section 115 proximate to the second end wall 113, and is spaced apart from a first portion of the second inner wall section 115 proximate to the first end wall 112. Besides, the radial hole 212 and the slot 236 face the engaging portion 15 in the direction parallel to the rotating axis (L2). The fastener extending hole 213 is moved adjacent to the guiding portion 14 to permit insertion of the guiding portion 14 into the fastener extending hole 213. The biasing end 421 of the biasing portion 42 abuts against the shaft member 2 and is pressed toward the first inner wall section 114 such that the biasing portion 42 is bent relative to the retained portion 41 at a biasing angle (θ1) to generate a biasing returning force.

With reference to FIGS. 1, 7 and 10, when the foldable device 100 is in a folded state, the shaft member 2 and the support shafts 20 are close to and parallel to one another in the first direction (Z), and are retracted along their lengthwise direction, the linking unit 30 and the seating unit 40 are collapsed, and the pivot shaft assembly 10 is positioned in a locked state, where the shaft member 2 is shortened and in the ready position, the retreat hole 222 of the movable tubular piece 22 is remote from the radial hole 212, the movable tubular wall 220 abuts against the abutted end 321, and the engaging end 322 is moved away from the radial hole 212 to be engaged in the engaging portion 15. Thus, the locking portion 32 is engaged with the engaging portion 15 such that the shaft member 2 cannot be rotated relative to the base seat 11.

At this stage, since the locking portion 32 extends in the direction parallel to the rotating axis (L2) and is engaged in the engaging portion 15, i.e. the rotating direction of the shaft member 2 is transverse to the extending direction of the locking portion 32, the engaging end 322 of the locking portion 32 is not disengaged from the engaging portion 15 when the shaft member 2 is pressed along its rotating direction. Moreover, with the secured section 311 retainingly engaged in the retaining groove 234, the locking member 3 is prevented from rotating relative to the pivot seat 23 about the rotating axis (L2) so as to retain the shaft member 2 more firmly.

Figure 11:
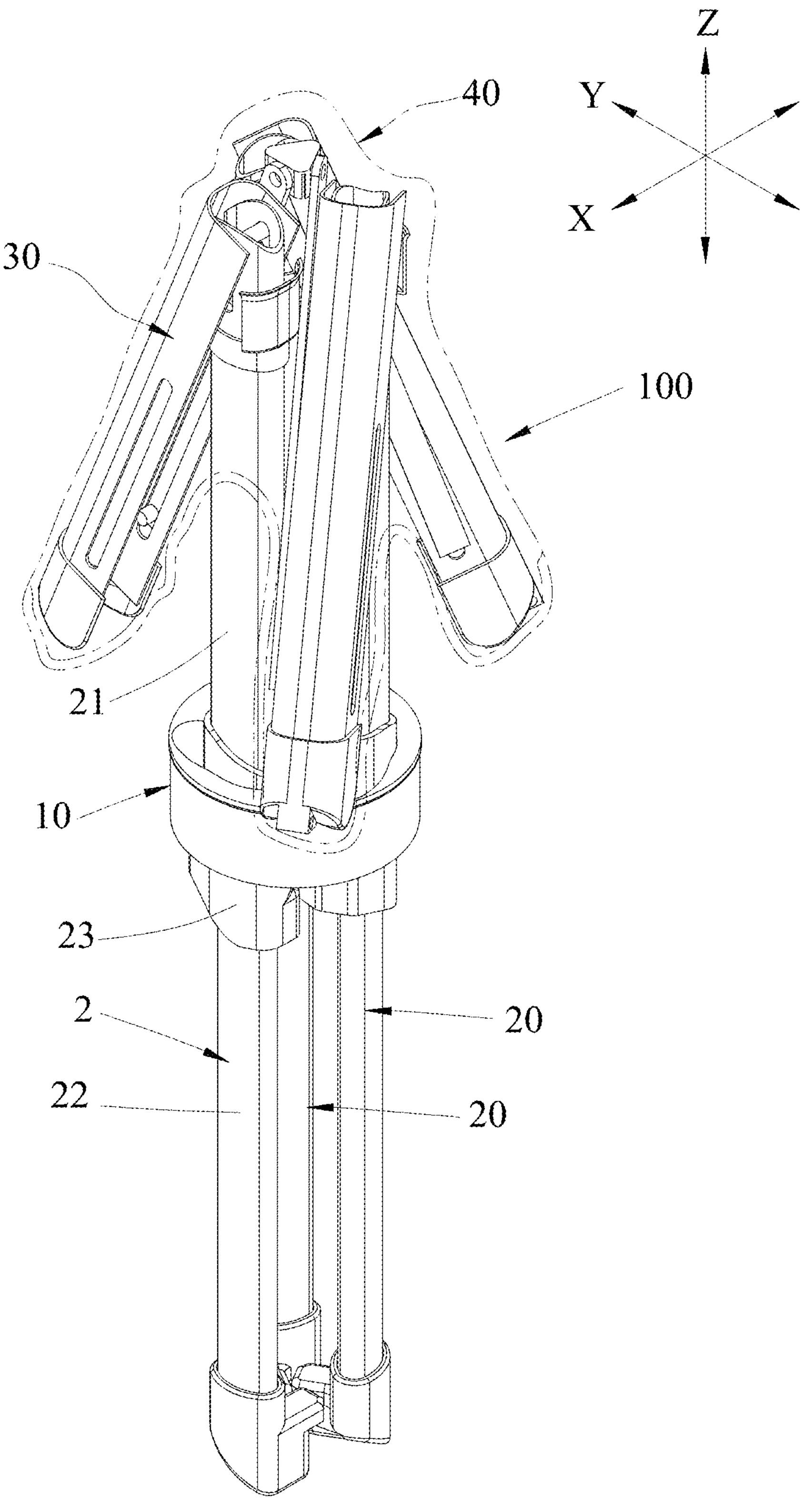
FIG. 11 is a perspective view illustrating the foldable device in an extended state, and the embodiment in a released state.
Figure 12:
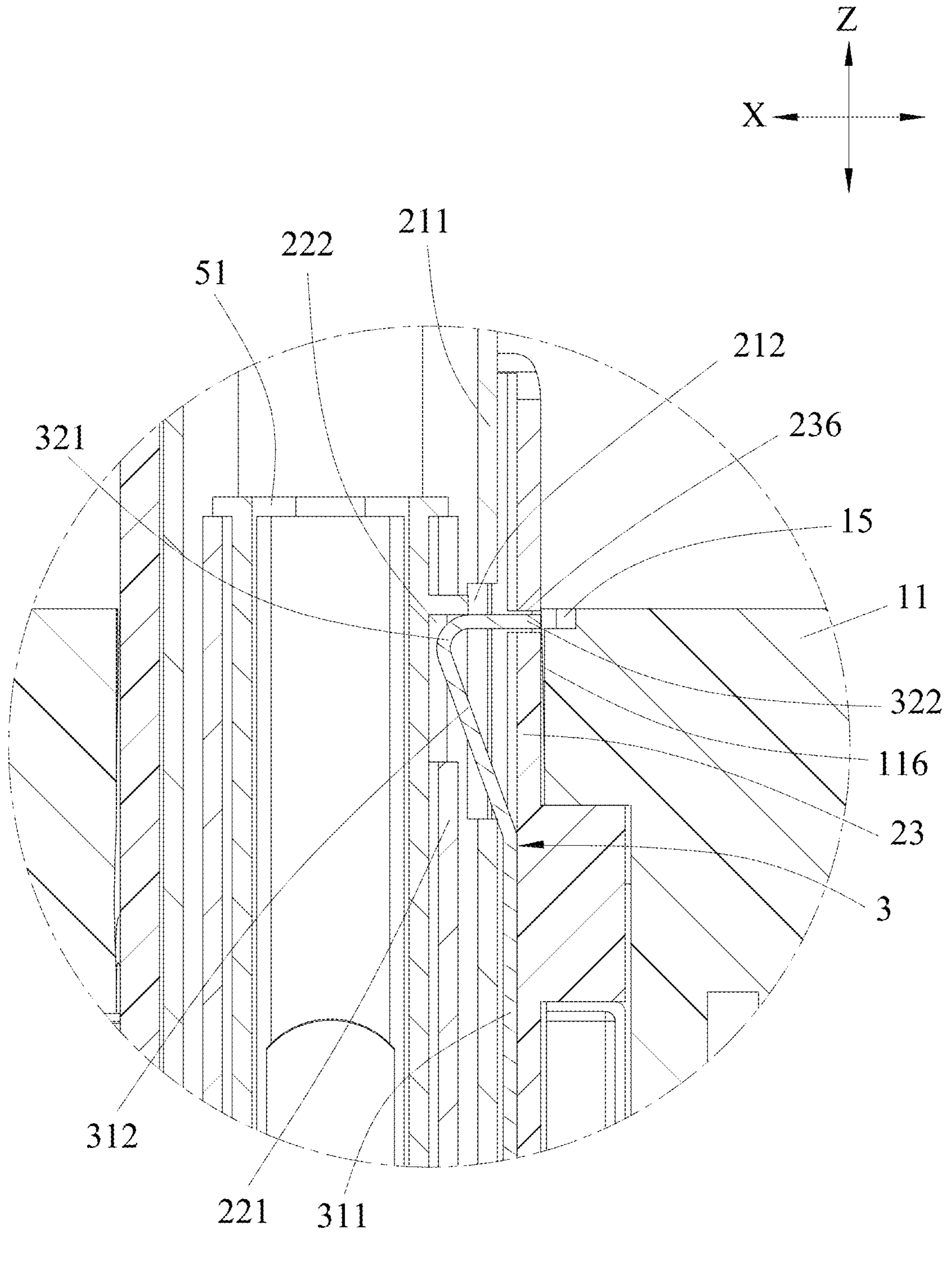
FIG. 12 is an enlarged sectional view similar to FIG. 10, illustrating the embodiment in the released state.
Figure 13:
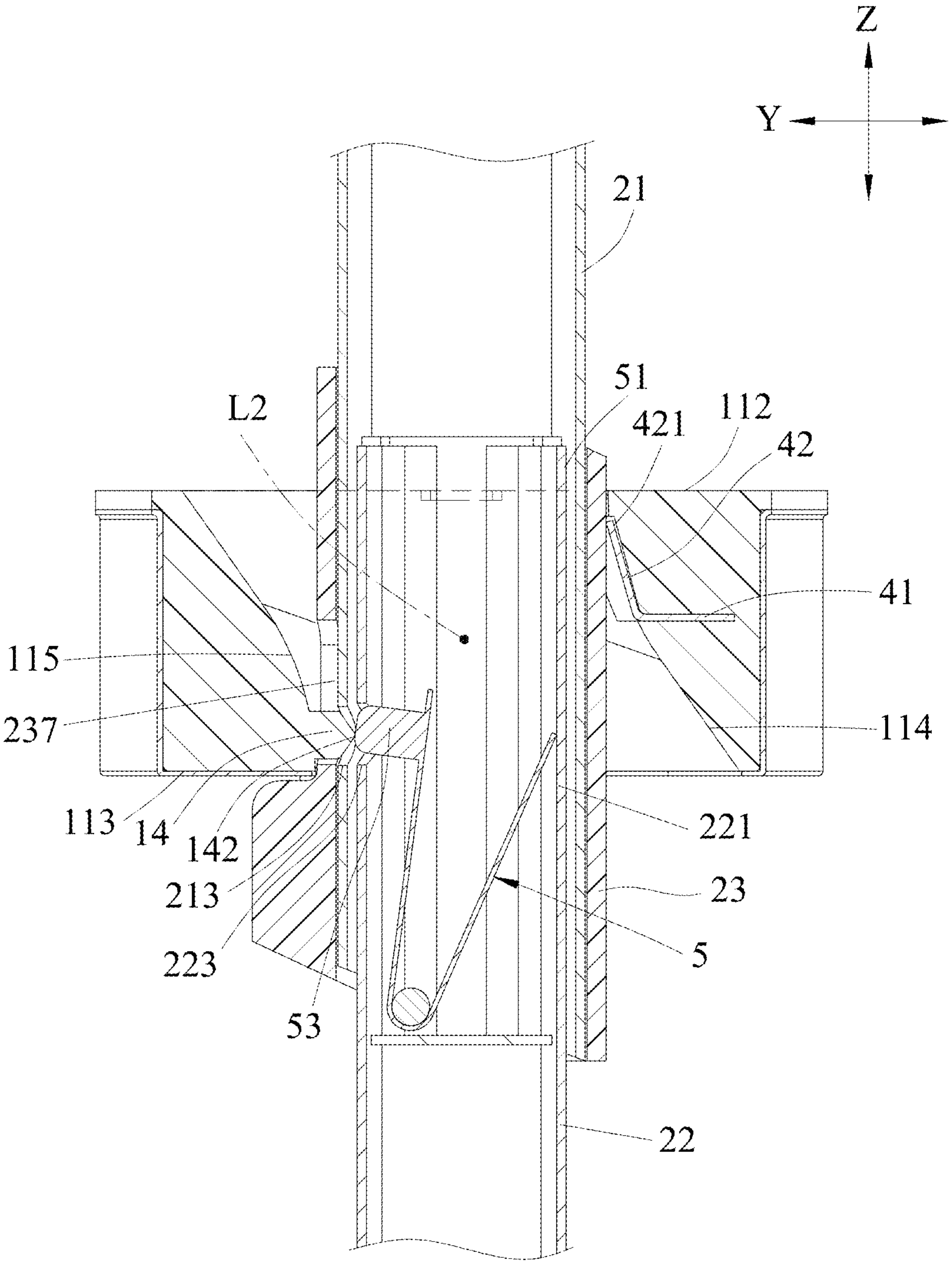
FIG. 13 is a sectional view similar to FIG. 8, illustrating the foldable device in the extended state and the embodiment in the released state.

With reference to FIGS. 11 to 13, the foldable device 100 is in an extended state, where the shaft member 2 and the support shafts 20 are extended, and the pivot shaft assembly 10 is shifted to a released state. When the pivot shaft assembly 10 is in the released state, the shaft member 2 is extended and in the ready position, the retreat hole 222 of the movable tubular piece 22 is aligned with the radial hole 212 of the fixed tubular piece 21, the abutted end 321 of the locking portion 32 is retreated in the retreat hole 222, and the engaging end 322 of the locking portion 32 is moved toward the radial hole 212 and is disengaged from the engaging portion 15. Meanwhile, the fastening hole 223 of the movable tubular piece 22 is aligned with the fastener extending hole 213, the fastening protrusion 53 is aligned with the fastener extending hole 213 and abuts against the tip end 142 of the guiding portion 14. The guiding portion 14 thrusts the fastening protrusion 53 into the fastening hole 223. At this stage, the locking portion 3 is disengaged from the engaging portion 15 so that the biasing portion 42 of the biasing member 4 urges the shaft member 2 to rotate relative to the base seat 11, and the movable tubular piece 22 is still movable relative to the fixed tubular piece 21.

In the following, the positional and connectional relationship among the component parts of the pivot shaft assembly 10 when the shaft member 2 is rotated relative to the base seat 11 about the rotating axis (L2) to a swung position is described.

Figure 14:
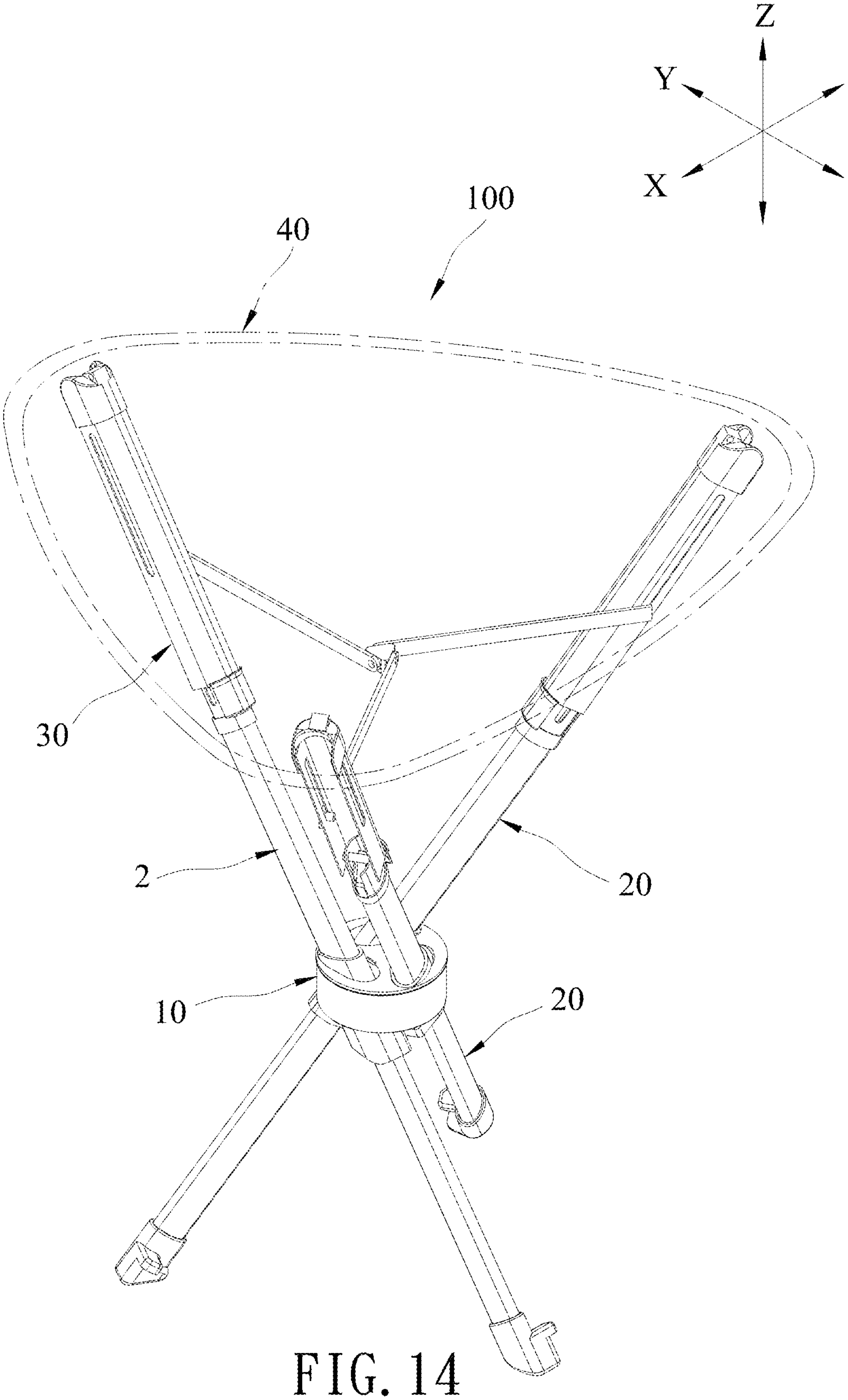
FIG. 14 is a perspective view illustrating the foldable device in a spread state, wherein the embodiment is in a retained state and the shaft member is in a swung position relative to the base seat.
Figure 15:
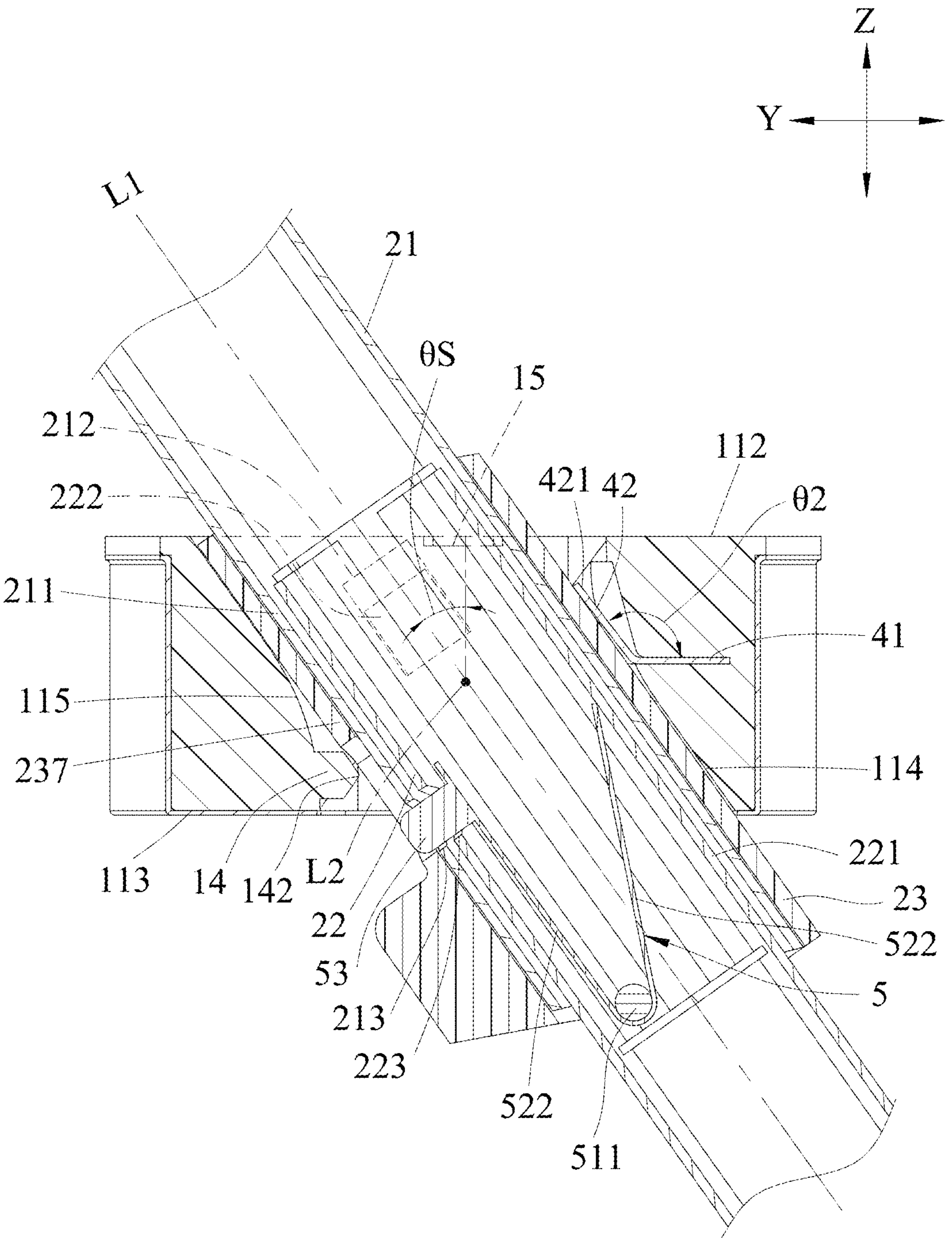
FIG. 15 is a sectional view similar to FIG. 13, illustrating the state in FIG. 14.

With reference to FIGS. 14 and 15, the foldable device 100 is in a spread state, and the shaft member 2 is rotated relative to the base seat 11 to the swung position, where the shaft member 2 is inclined relative to the first direction (Z) by an inclined angle (OS), the first side of the shaft member 2 facing the first inner wall section 114 abuts against the second portion of the first inner wall section 114 proximal to the second end wall 113 and is spaced apart from the first portion of the first inner wall section 114 proximal to the first end wall 112, and the second side of the shaft member 2 facing the second inner wall section 115 abuts against the first portion of the second inner wall section 115 proximal to the first end wall 112 and is spaced apart from the second portion of the second inner wall section 115 proximal to the second end wall 113. Meanwhile, the radial hole 212 is remote from the engaging portion 15. The fastener extending hole 213 is remote from the guiding portion 14. The biasing end 421 of the biasing portion 42 urges the shaft member 2 away from the first inner wall section 114, and is bent relative to the retained portion 41 at a released angle (θ2) that is larger than the biasing angle (θ1).

As mentioned above, when the shaft member 2 is in the ready position, the biasing member 4 has a torque which urges the shaft member 2 to rotate toward the swung position.

At this stage, the shaft member 2 and the support shafts 20 are rotated and spread out relative to the base seat 11 and are inclined and intersect one another. The linking unit 30 and the seating unit 40 are spread out by the shaft member 2 and the support shafts 20, and the pivot shaft assembly 10 is shifted to a retained state. Specifically, when the pivot shaft assembly 10 is in the retained state, the shaft member 2 is extended and positioned in the swung position, and the fastening protrusion 53 extends through the fastener extending hole 213 so as to retain the movable tubular piece 22 relative to the fixed tubular piece 21. Since the pivot pin 511 is disposed at the side adjacent to the fastening hole 223, when the fastening protrusion 53 projects through the fastening hole 223, the leaf spring portion 522 with the fastening protrusion 53 extends substantially parallel to the central axis (L1), and the fastening protrusion 53 projects along a direction substantially transverse to the direction of the central axis (L1). Thus, the fastening protrusion 53 is smoothly and successfully engaged with the fastening hole 223 and the fastener extending hole 213 without being stuck.

With reference to FIGS. 10, 12, 13 and 15, the operation of shifting the foldable device 100 from the folded state to the spread state is described as follows. When the foldable device 100 is in the folded state, the pivot shaft assembly 10 is in the locked state. Then the shaft member 2 and the support shafts 20 are elongated, the pivot shaft assembly 10 is shifted from the locked state to the released state, and the foldable device 100 is shifted from the folded state to the extended state. Subsequently, the shaft member 2 and the support shafts 20 are released to release the biasing force of the biasing member 4, and the biasing portion 42 urges the shaft member 2 to rotate to the swung position and actuate the support shafts 20 to rotate and spread. Meanwhile, the fastening protrusion 53 slides along the guiding portion 14 and projects through the fastener extending hole 213 so as to automatically retain the length of the shaft member 2. Thus, the pivot shaft assembly 10 is shifted from the released state to the retained state, and the foldable device 100 is shifted from the extended state to the spread state.

Figure 16:
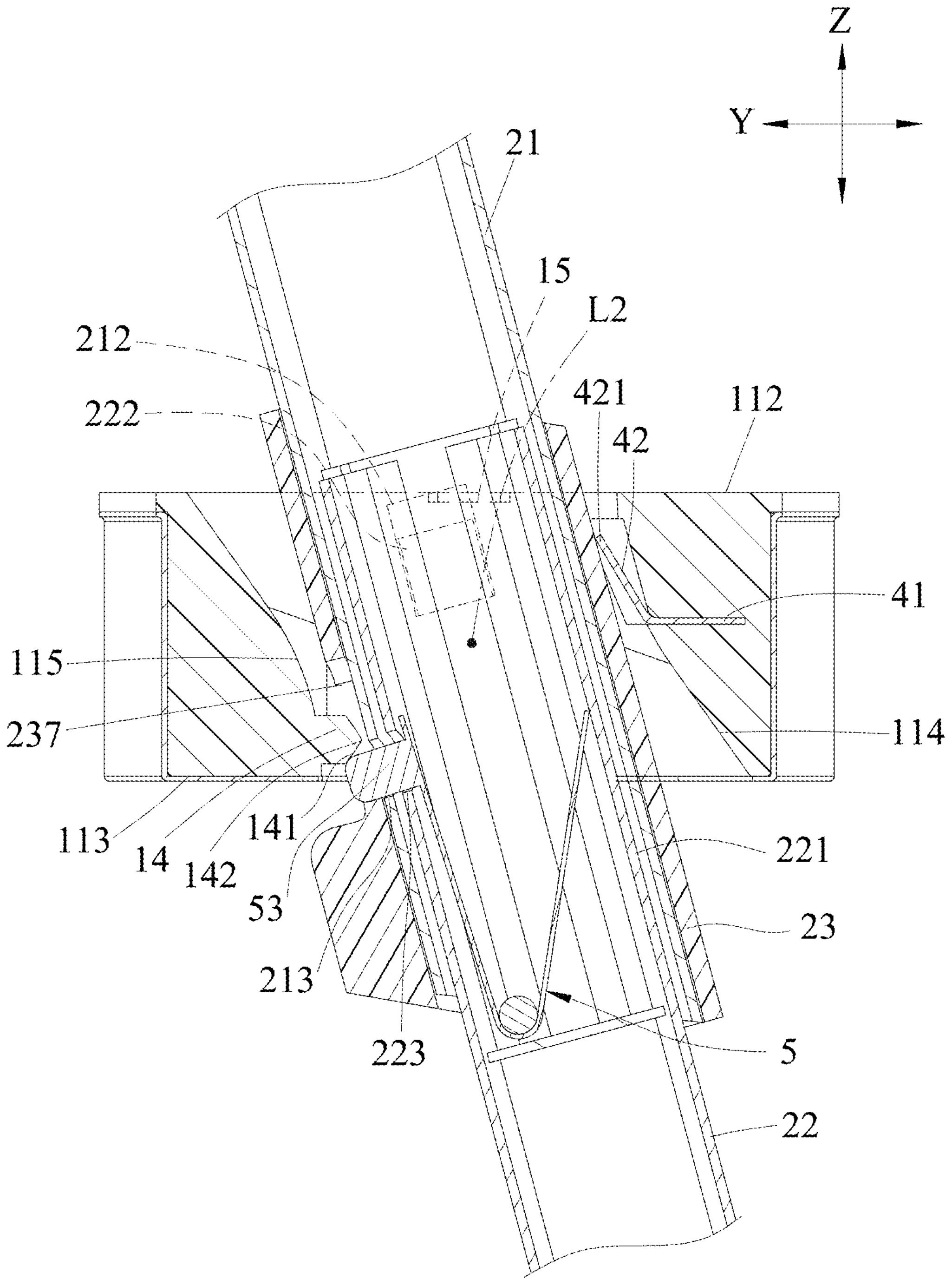
FIG. 16 is a sectional view similar to FIG. 15, illustrating the state when the shaft member is rotated from the swung position toward the ready position.

With reference to FIGS. 13, 15 and 16, the operation of shifting the foldable device 100 from the spread state to the folded state is described as follows. The user pulls close the support shafts 20 and the shaft member 2 together to rotate the shaft member 2 from the swung position to the ready position, the pivot shaft assembly 10 is shifted from the retained state to the released state, and the foldable device 100 is shifted from the spread state to the extended state. During rotation of the shaft member 2, the fastening protrusion 53 firstly abuts against and slides along the taper guiding slope 141 of the guiding portion 14 to the tip end 142 so as to be pressed into the fastening hole 223, and the shaft member 2 and the support shafts 20 then are shortened such that the pivot shaft assembly 10 is shifted from the released state to the locked state, and the foldable device 100 is shifted from the extended state to the folded state. The folding operation of the foldable device 100 is convenient and effortless to conduct. It is noted that the user only pulls the shaft member 2 to bring the fastening protrusion 53 to be pressed into the fastening hole 223 by the guiding portion 14 without the need to manually operate the fastening protrusion 53 so as to render the folding operation more convenient and safer.

As illustrated, with the locking member 3 disposed on the shaft member 2 and the engaging portion 15 disposed on the base seat 11, the shaft member 2 is conveniently locked to the base seat 11 to fold the foldable device 100. With the biasing member 4 disposed on the base seat 11, the pivot shaft assembly 10 is automatically rotated relative to the base seat 11 when the locking member 3 is released so as to permit the foldable device 100 to spread automatically. With the fastening unit 5 disposed on the movable tubular piece 22, and the guiding portion 14 disposed on the base seat 11, the pivot shaft assembly 10 has a function of automatically retaining the length of the shaft member 2 when the shaft member 2 is rotated and the foldable device 100 is spread out. Also, during folding of the foldable device 100, the fastening protrusion 53 of the fastening unit 5 is automatically pressed by the guiding portion 14 to perform the subsequent shortening operation of the shaft member 2. That is, with the pivot shaft assembly 10 employed on the foldable device 100, the foldable device 100 is folded and spread out easily, effortlessly, conveniently and safely. Moreover, the locking member 3, the biasing member 4 and the fastening unit 5 have a simple structure and are manufactured at a relatively low cost.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A pivot shaft assembly for a foldable device, comprising:

a pivot base including a base seat, a through hole which extends through said base seat in a first direction, and an engaging portion which is disposed on said base seat adjacent to said through hole;

a shaft member extending along a central axis through said through hole, said shaft member including a fixed tubular piece which extends through said through hole and which has a fixed tubular wall surrounding the central axis, said fixed tubular piece being pivotably connected with said base seat about a rotating axis which is transverse to the central axis and the first direction, said fixed tubular piece having a radial hole which extends radially relative to the central axis through said fixed tubular wall, said shaft member being rotatable relative to said base seat between a ready position, where said shaft member extends parallel to the first direction, and said radial hole faces said engaging portion, and a swung position, where said shaft member is inclined relative to the first direction by an inclined angle, and said radial hole is remote from said engaging portion; and a locking member including a locking portion which is movably disposed in said radial hole such that said locking portion is movable radially and outwardly of said fixed tubular wall through said radial hole to engage with said engaging portion when the shaft member is in the ready position, to position said pivot shaft assembly in a locked state so as to prevent rotation of said shaft member relative to said base seat, and such that said locking portion is movable radially and inwardly of said fixed tubular wall through said radial hole to disengage from said engaging portion to make said pivot shaft assembly be in a released state so as to permit rotation of said shaft member relative to said base seat.

2. The pivot shaft assembly of claim 1, wherein said shaft member further has a movable tubular piece which is movably disposed within said fixed tubular piece and which has a movable tubular wall surrounding the central axis, said movable tubular piece having a retreat hole which extends radially relative to the central axis through said movable tubular wall, said locking member further including a deformable portion which is securely disposed on said fixed tubular wall and which is connected with said locking portion, said locking portion extending radially through said radial hole to have an abutted end which is proximal to said movable tubular piece, and an engaging end which is opposite to said abutted end and outwardly of said radial hole, said deformable portion being disposed with a biasing force which urges said locking portion toward said movable tubular wall such that, when said pivot shaft assembly is in the released state, said retreat hole is aligned with said radial hole, said abutted end is retreated in said retreat hole and said engaging end is moved toward said radial hole, and such that, when said pivot shaft assembly is in the locked state, said retreat hole is remote from said radial hole, said movable tubular wall abuts against said abutted end, and said engaging end is moved away from said radial hole to be engaged with said engaging portion.

3. The pivot shaft assembly of claim 1, wherein said base seat has an inner seat wall which defines said through hole, said engaging portion being a slot which is recessed from said inner seat wall for said locking portion to be engaged therein.

4. The pivot shaft assembly of claim 2, wherein said radial hole and said retreat hole extend in a radial direction parallel to the rotating axis through said fixed tubular wall and said movable tubular wall, respectively.

5. The pivot shaft assembly of claim 2, wherein said locking member is in form of an integrally formed leaf spring which is bent with two bending joints, said deformable portion having a secured section securely disposed on said fixed tubular wall, and a spring section extending from said secured section toward said movable tubular wall at an inclined angle relative to said secured section, said abutted end extending from and being bent relative to said spring section.

6. The pivot shaft assembly of claim 5, wherein said base seat has an inner seat wall which defines said through hole, said shaft member further including a pivot seat which is securely connected with and surrounds said fixed tubular wall and which is pivotably connected with said base seat, said pivot seat having an outer surrounding surface which faces said inner seat wall of said base seat, an inner surrounding surface which is radially opposite to said outer surrounding surface and which surrounds said fixed tubular wall, and a slot which extends radially from said outer surrounding surface to said inner surrounding surface and which is aligned with said radial hole, said secured section of said deformable portion being securely interposed between said pivot seat and said fixed tubular piece and adjacent to said radial hole, said locking portion being movably disposed in said slot.

7. The pivot shaft assembly of claim 6, wherein said pivot seat has a retaining groove which is formed in said inner surrounding surface and which extends along a direction parallel to the central axis, said secured section extending along the direction parallel to the central axis and being retainingly engaged in said retaining groove.

8. The pivot shaft assembly of claim 6, wherein said base seat further has a pivot hole which is formed in said inner seat wall, said pivot seat further having a pivot pin which projects from said outer surrounding surface and which is rotatably disposed in said pivot hole to define the rotating axis.

9. The pivot shaft assembly of claim 5, wherein said spring section of said deformable portion is bent away from said secured section at an included angle which is greater than 90 degrees and smaller than 180 degrees, said abutted end of said locking portion being bent at a bending angle which is smaller than 90 degrees.

10. The pivot shaft assembly of claim 1, wherein said base seat has an inner seat wall which defines said through hole, a first end wall and a second end wall which are respectively connected with two sides of said inner seat wall along the first direction and opposite to each other, the rotating axis extending along a second direction which is transverse to the first direction, said inner seat wall having a first inner wall section and a second inner wall section which are opposite to each other along a third direction that is transverse to both the first direction and the second direction and at two sides of said through hole, respectively, and a connecting wall section which interconnects said first inner wall section and said second inner wall section and with which said fixed tubular piece is pivotably connected, each of said first inner wall section and said second inner wall section extends and is inclined relative to the first direction such that, when said shaft member is in the ready position, said shaft member has a first side which faces said first inner wall section and which abuts against a first portion of said first inner wall section proximate to said first end wall, and is spaced apart from a second portion of said first inner wall section proximate to said second end wall, and a second side which faces said second inner wall section and which abuts against a second portion of said second inner wall section proximate to said second end wall, and is spaced apart from a first portion of said second inner wall section proximate to said first end wall, and such that, when said shaft member is in the swung position, said first side of said shaft member abuts against said second portion of said first inner wall section and is spaced apart from said first portion of said first inner wall section, and said second side of said shaft member abuts against said first portion of said second inner wall section and is spaced apart from said second portion of said second inner wall section.

11. The pivot shaft assembly of claim 1, further comprising a biasing member disposed on said base seat to have a torque which urges said shaft member to rotate toward the swung position when said pivot shaft assembly is shifted from the locked state to the released state.

* * * * *